(12) United States Patent
Talesky et al.

(10) Patent No.: US 9,962,778 B2
(45) Date of Patent: May 8, 2018

(54) RATCHET AND RELEASE MECHANISM FOR SWING ARM OF TABLE SAW

(71) Applicants: Robert Bosch Tool Corporation, Broadview, IL (US); Robert Bosch GmbH, Stuttgart (DE)

(72) Inventors: Mark S. Talesky, Huntley, IL (US); Jan Koegel, Freudenstadt (DE); Brian Taylor, Elmhurst, IL (US); Timothy Szweda, Chicago, IL (US); Gregory Chaganos, Chicago, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 154 days.

(21) Appl. No.: 14/968,984

(22) Filed: Dec. 15, 2015

(65) Prior Publication Data

US 2016/0167142 A1 Jun. 16, 2016

Related U.S. Application Data

(60) Provisional application No. 62/092,124, filed on Dec. 15, 2014.

(51) Int. Cl.
*B26D 5/00* (2006.01)
*B26D 1/18* (2006.01)
(Continued)

(52) U.S. Cl.
CPC ........... *B23D 47/08* (2013.01); *B23D 45/067* (2013.01); *B27G 19/02* (2013.01)

(58) Field of Classification Search
CPC ....... B23D 47/08; B23D 45/067; B27G 19/02
(Continued)

(56) References Cited

U.S. PATENT DOCUMENTS 3,954,051 A * 5/1976 Steiniger .................. A24C 5/31
493/45
6,826,988 B2 * 12/2004 Gass ...................... B23D 45/06
192/129 R (Continued)

OTHER PUBLICATIONS

International Search Report and Written Opinion corresponding to PCT Application No. PCT/US2015/065888, dated Mar. 2, 2016 (18 pages).

(Continued)

*Primary Examiner* — Ghassem Alie
*Assistant Examiner* — Bharat C Patel
(74) *Attorney, Agent, or Firm* — Maginot Moore & Beck LLP

(57) ABSTRACT

A table saw includes a safety system to protect a user from injury. The safety system detects a sensed condition and rapidly moves a saw blade away from the user. The safety system includes a dual ratchet mechanism to prevent the blade from rebounding back above a work surface after an initial rapid retraction of the blade. The table saw has a swing arm that rotates to move the blade below the work surface. A first ratchet engages a first contact surface of the swing arm after rotation of the swing arm over a first range of angular displacements to prevent counter rotation of the swing arm. A second ratchet engages a second contact surface of the swing arm after rotation of the swing arm over a second range of angular displacements to prevent counter rotation of the swing arm.

17 Claims, 10 Drawing Sheets

(51) Int. Cl.
  *B27B 27/04* (2006.01)
  *B27B 3/28* (2006.01)
  *B23D 47/08* (2006.01)
  *B23D 45/06* (2006.01)
  *B27G 19/02* (2006.01)

(58) Field of Classification Search
  USPC .......................................................... 83/58
  See application file for complete search history.

(56) References Cited

U.S. PATENT DOCUMENTS

| | | | | |
|---|---|---|---|---|
| 6,922,153 B2 * | 7/2005 | Pierga | ................. | B23D 45/067 |
| | | | | 318/16 |
| 6,957,601 B2 * | 10/2005 | Gass | ................... | B23D 59/001 |
| | | | | 83/471.2 |
| 7,225,712 B2 * | 6/2007 | Gass | ..................... | B23D 47/08 |
| | | | | 83/471.3 |
| 7,350,444 B2 * | 4/2008 | Gass | ..................... | B23D 45/06 |
| | | | | 83/397.1 |
| 7,628,101 B1 * | 12/2009 | Knapp | ................. | B23D 45/067 |
| | | | | 83/471.2 |
| 7,698,975 B2 * | 4/2010 | Peot | ..................... | B23D 59/001 |
| | | | | 83/477.2 |
| 8,074,546 B1 * | 12/2011 | Knapp | ................. | B23D 45/067 |
| | | | | 83/471.3 |
| 8,210,076 B2 * | 7/2012 | Oberheim | .............. | B27G 19/02 |
| | | | | 83/477.2 |
| 8,291,801 B2 * | 10/2012 | Chung | ................. | B23D 45/067 |
| | | | | 83/477.2 |
| 8,327,744 B2 * | 12/2012 | Groth | ................... | B23D 45/067 |
| | | | | 83/477.2 |
| 8,424,429 B1 | 4/2013 | Knapp et al. | | |
| 9,346,184 B2 * | 5/2016 | Niichel | ................... | B27B 25/10 |
| 9,511,429 B2 * | 12/2016 | Doumani | ............. | B23D 45/065 |
| 9,517,516 B2 * | 12/2016 | Doumani | ............. | B23D 59/006 |
| 2005/0268767 A1 | 12/2005 | Pierga et al. | | |
| 2011/0048195 A1 | 3/2011 | Chung et al. | | |
| 2014/0182430 A1 * | 7/2014 | Haldar | ................. | B23D 45/065 |
| | | | | 83/72 |
| 2014/0260861 A1 | 9/2014 | Doumani et al. | | |

OTHER PUBLICATIONS

Frane, David, "Bosch Takes Aim at SawStop", Tools of the Trade 2015, Mar. 19, 2015, http://www.toolsofthetrade.net/table-saws/bosch-takes-aim-at-sawstop_o.aspx (2 pages).

Frane, David, "SawStop Jobsite Table Saw", Tools of the Trade 2014, Dec. 8, 2014, http://www.toolsofthetrade.net/table-saws/sawstop-jobsite-table-saw_o_aspx (2 pages).

* cited by examiner

| Height in MM above the table | Starting height in MM | Starting angle of swing arm | Travel measured against height adjust carriage | Total travel to stop | Blade level to table top - angle measured against height adjust carriage | Allowable bounce back before breaking table plane in degrees |
|---|---|---|---|---|---|---|
| 83 | 41 | 8.7 | 55 | 63.7 | 41.5 | 13.5 |
| 73 | 51 | 8.7 | 52 | 60.7 | 34 | 18 |
| 63 | 61 | 8.7 | 49 | 57.7 | 28 | 21 |
| 53 | 71 | 8.7 | 46 | 54.7 | 21 | 25 |
| 43 | 81 | 8.7 | 43 | 51.7 | 15 | 28 |
| 33 | 91 | 8.7 | 40 | 48.7 | 9.5 | 30.5 |
| 23 | 101 | 8.7 | 37 | 45.7 | 4 | 33 |
| 13 | 111 | 8.7 | 34 | 42.7 | -2 | 36 |
| 3 | 122 | 8.7 | 31 | 39.7 | -7 | 38 |

Swing arm rotation is 24 degrees less from highest blade position to lowest blade position Angular displacement of the swing arm as the blade moves from highest position to lowest position

RATCHET AND RELEASE MECHANISM FOR SWING ARM OF TABLE SAW

This application claims the benefit of U.S. Provisional Application No. 62/092,124, filed Dec. 15, 2014, the disclosure of which is incorporated herein by reference in its entirety.

TECHNICAL FIELD

The present disclosure relates to power tools and more particularly to power tools with exposed shaping devices.

BACKGROUND

A number of power tools have been produced to facilitate forming a work piece into a desired shape. One such power tool is a table saw. A wide range of table saws are available for a variety of uses. Some table saws are very heavy and relatively immobile. Other table saws, sometimes referred to as job site table saws, are relatively light and portable so that a user can easily transport and position the table saw at a job site. All table saws, including cabinet table saws and job site table saws, present a safety concern because the saw blade of the table saw is typically very sharp and moving at a high rate of speed. Accordingly, severe injury such as severed digits and deep lacerations can occur almost instantaneously.

Various types of safety systems have been developed for table saws in response to the dangers inherent in an exposed blade moving at high speed. One such safety system is a blade guard. Blade guards movably enclose the saw blade, thereby providing a physical barrier that must be moved before the rotating blade is exposed. While blade guards are effective to prevent some injuries, the blade guards can be removed by a user either for convenience of using the table saw or because the blade guard is not compatible for use with a particular shaping device.

Table saw safety systems have also been developed which are intended to stop the blade when a user's hand approaches or touches the blade. Various stopping devices have been developed including braking devices which are physically inserted into the teeth of the blade. Such approaches are extremely effective. Upon actuation of this type of braking device, however, the blade is typically ruined because of the braking member. Additionally, the braking member is typically destroyed. Accordingly, the user must replace the blade and the braking member, often at considerable expense, after actuation of the safety device. Another shortcoming of this type of safety device is that the shaping device must be toothed. Moreover, if a spare blade and braking member are not on hand, a user must travel to a store to obtain replacements. Thus, while effective, this type of safety system can be expensive and inconvenient.

Some table saw safety systems, including some systems that incorporate blade braking devices, also move the blade below the surface of the table saw to prevent further contact with the user once the safety system detects an initial contact. FIGS. 1 and 2 depict a known table saw 100 that includes a safety system that moves the blade below the table saw surface in response to blade contact with the user. The table saw 100 includes a base housing 102 and a work-piece support surface 104. A riving knife or splitter 106 is positioned adjacent to a blade 108 which extends from within the base housing 102 to above the work-piece support surface 104. A blade guard (not shown) may be attached to the splitter 106. An angle indicator 110 indicates the angle of the blade 108 relative to the work-piece support surface 104. A bevel adjust turn-wheel 112 may be used to establish the angle of the blade 108 with respect to the work-piece support surface 104 by pivoting a frame 114 (FIG. 2) within the base housing 102.

A motor 116, which is powered through a switch 118 located on the base housing 102, is supported by a carriage assembly 120. The carriage assembly 120 and a stop pad 122 are supported by the frame 114. The carriage assembly 120 includes a carriage 124 to which the motor 116 is mounted and two guiderails 126/128. The position of the carriage 124 along the guiderails 126/128 is controlled by a blade height turn-wheel 130 through a gearing assembly 132 and a height adjustment rod 134. The carriage 124 fixedly supports a latch assembly 140 and supports a swing arm assembly 142.

The swing arm assembly 142 is pivotally coupled to the carriage 124 for movement between a latched position in which the blade is held above the support surface 104 and a de-latched position in which the blade is allowed to rotate into the base housing 102. As shown in FIG. 3, the swing arm assembly 142 includes a housing 144. The housing 144 encloses a power wheel (not shown) that is driven by an output shaft 152 of the motor 116. The output shaft 152 may be directly driven by the motor 116 or by a reduction gear. A belt (not shown) transfers rotational movement from the power wheel 150 to a blade wheel 156. A nut 158 is used to affix the blade 108 (not shown in FIG. 3 for purpose of clarity) to the blade wheel 156. Additionally, as shown in FIG. 3, the swing arm assembly 142 may also include a strike plate 146 and a rebound plate 148 mounted on the housing 144.

In operation, the swing arm assembly 142 is initially maintained in a latched position with the blade wheel 156 positioned sufficiently close to the work-piece support surface 104 such that the blade 108 extends above the work-piece support surface 104 as shown in FIG. 1. A user operates the bevel adjust turn wheel 112 to pivot the frame 114 with respect to the work-piece support surface 104 to establish a desired angle between the blade 108 and the work-piece support surface 104. The user further operates the blade height adjustment turn-wheel 130 to move the carriage 124 along the guiderails 126/128 to establish a desired height of the blade 108 above the work-piece support surface 104. Using the switch 118, power is then applied to the motor 116 causing the output shaft 152 and the power wheel to rotate. Rotation of the power wheel 150 causes the belt to rotate the blade wheel 156 and the blade 108 which is mounted on the blade wheel 156. A work-piece may then be shaped by moving the work-piece into contact with the blade 108.

The table saw 100 includes a sensing and control circuit (not shown) which activates an actuator, such as a solenoid or a pyrotechnic cartridge, in response to a sensed condition. Any desired sensing and control circuit may be used for this purpose. One known sensing and control circuit is described in U.S. Pat. No. 6,922,153, the entire contents of which are herein incorporated by reference. The safety detection and protection system described in the '153 patent senses an unsafe condition and provides a control signal which, in the table saw 100, is used to activate the actuator.

Upon activation of the actuator, an actuator pin is forced outwardly from the actuator. When the swing arm assembly 142 is maintained in a latched position, the strike plate 146 is aligned with the solenoid. Accordingly, as the actuator pin is forced out of the actuator, the actuator pin contacts the strike plate 146, which releases the latch assembly 140 and imparts an impact force on the swing arm assembly 142. Consequently, the swing arm assembly 142 pivots about the output shaft 152 such that the blade wheel 156 moves away from the work-piece support surface 104. Accordingly, the blade 108 is pulled by the swing arm assembly 142 in a direction away from the work-piece support surface 104.

The swing arm assembly 142 continues to pivot about the output shaft 152 until a foot 192 of the swing arm assembly 142 contacts the stop pad 122. Accordingly, further rotation of the swing arm assembly 142 is impeded by the stop pad 122. At this position, the blade 108 is completely located below the work-piece support surface 104. Therefore, an operator above the work-piece support surface 104 cannot be injured by the blade 108.

The stop pad 122 can be formed from microcellular polyurethane elastomer (MPE). MPEs form a material with numerous randomly oriented air chambers. Some of the air chambers are closed and some are linked. Additionally, the linked air chambers have varying degrees of communication between the chambers and the orientation of the linked chambers varies. Accordingly, when the MPE structure is compressed, air in the chambers is compressed. As the air is compressed, some of the air remains within various chambers, some of the air migrates between other chambers, and some of the air is expelled from the structure. One such MPE is MH 24-65, commercially available from Elastogran GmbH under the trade name CELLASTO®.

Use of an MPE or other appropriate material in the stop pad 122 stops rotation of the swing arm assembly 142 without damaging the swing arm assembly 142. However, prior to impacting the stop pad 122, the swing arm assembly 142 may be moving with sufficient force to cause the swing arm assembly to rebound off of the stop pad 122. For instance, in some table saw safety systems, a pyrotechnic device is detonated in order to generate the high-energy actuating force on the swing arm assembly 142 needed to rapidly move the blade 108 below the support surface 104 when the safety system detects contact with the user. The energy applied to rotate the swing arm assembly 142 can be partially absorbed by the material of the stop pad 122, but due to the high energy displacement of the swing arm assembly 142, some rebound is still possible. In such a circumstance, the swing arm assembly 142 will rotate about the power shaft 152 in a counterclockwise direction. Thus, the blade 108 moves toward the work-piece support surface 104.

In view of the foregoing, it would be advantageous to provide a power tool with a safety system that prevents a rotating blade from rebounding toward a user after the blade is moved away from the user in response to contact between the user and the blade. A safety system that decreases the activation time to prevent such rebounding of the blade would be further advantageous. A further advantage would be realized by a safety system that could be reset without the need for disassembly of the power tool.

SUMMARY

A table saw in one embodiment includes a frame that supports a work surface, a swing arm that cooperates with the frame via a pivot, the swing arm defining first and second contact surfaces disposed concentrically about and proximate to the pivot, a blade rotatably attached to the swing arm at a position spaced from the pivot, the blade having an operating position in which the blade extends above the work surface and a retracted position in which an uppermost extent of the blade is positioned below the work surface, the swing arm rotatable about the pivot to move the blade from the operating position to the retracted position in response to a sensed condition, a first ratchet configured to cooperate with the first contact surface so as to maintain the blade in the retracted position after the swing arm rotates over any one of a first range of angular displacements from the operating position, and a second ratchet configured to cooperate with the second contact surface so as to maintain the blade in the retracted position after the swing arm rotates over any one of a second range of angular displacements from the operating position, the second range of angular displacements including angular displacements that are greater than angular displacements of the first range of angular displacements.

A table saw in another embodiment includes a frame that supports a work surface, a swing arm that cooperates with the frame via a pivot, the swing arm defining a contact surface disposed concentrically about and proximate to the pivot, a blade rotatably attached to the swing arm at a position spaced from the pivot, the blade having an operating position in which the blade extends above the work surface and a retracted position in which an uppermost extent of the blade is positioned below the work surface, the swing arm rotatable about the pivot to move the blade from the operating position to the retracted position in response to a sensed condition, and a ratchet configured to cooperate with the contact surface so as to maintain the blade in the retracted position after the swing arm rotates over any one of a range of angular displacements from the operating position.

BRIEF DESCRIPTION OF DRAWINGS

FIG. 4 shows a table illustrating the change in angular displacement of a swing arm in accordance with the principles of the disclosure as the height of a blade attached to the swing is moved between its operating range;

FIG. 15 shows a table illustrating angular displacements of the swing arm assembly in which the first pawl is in the first active position, but the second pawl is not yet in the second active position.

DESCRIPTION

Figure 1:
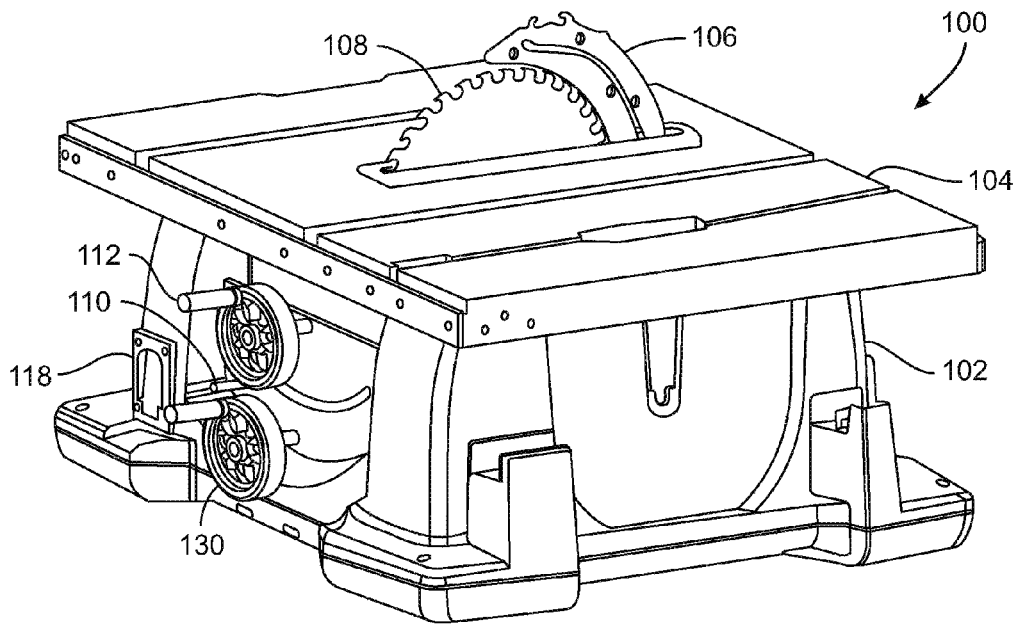
FIG. 1 depicts a top perspective view of a prior art table saw incorporating a safety system that that moves a blade below a work-piece support surface in response to blade contact with a user.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 2:
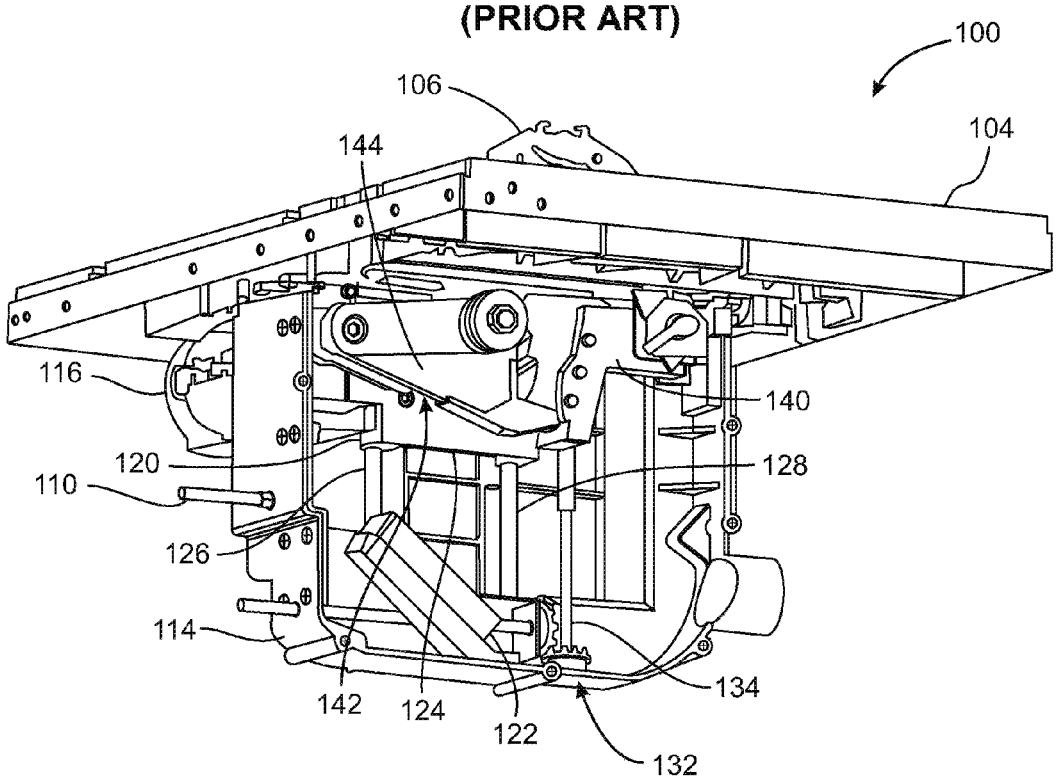
FIG. 2 depicts a bottom perspective view of the table saw of FIG. 1 with a housing of the table saw removed showing a movable carriage mounted on a pivoting frame beneath the work-piece support surface.
Figure 3:
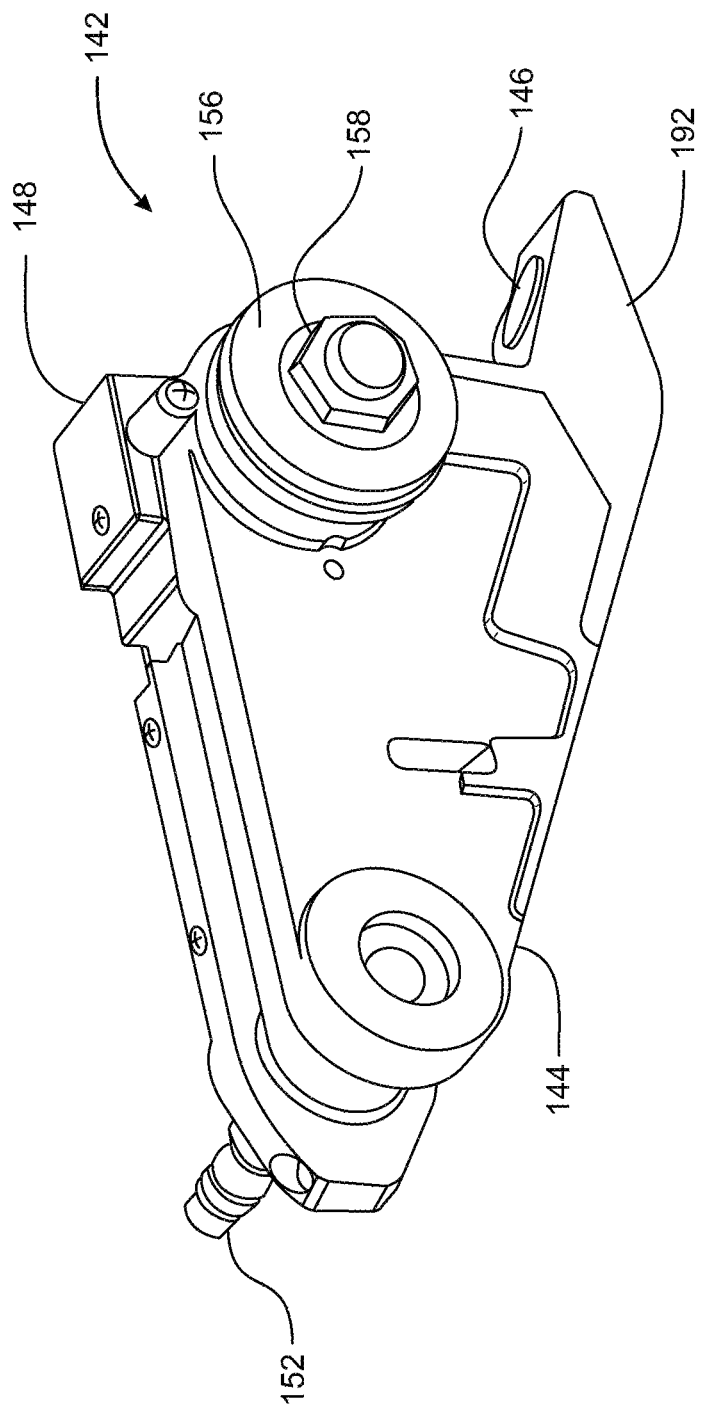
FIG. 3 depicts a perspective view of a swing arm assembly of the table saw of FIG. 1.
Figure 5:
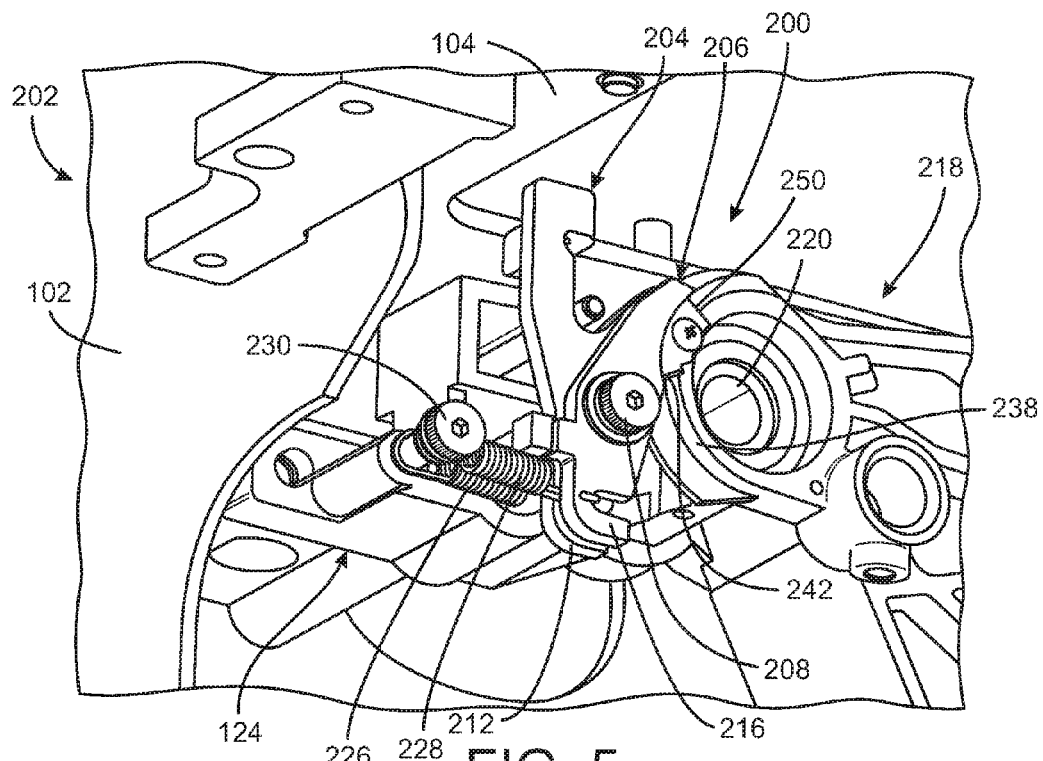
FIG. 5 depicts a bottom perspective view of a table saw with a safety system incorporating a dual ratchet mechanism to prevent a swing arm of the table saw from rebounding toward a work-piece support surface after the swing has been moved away from the user in response to blade contact with a user.

FIG. 5 shows a dual ratchet system 200 for a table saw 202 that includes a safety system for moving a rotating saw blade 108 (FIG. 1) below a work-piece table support surface 104 in response to certain conditions, such as blade contact with a user. Elements of the table saw 202 that are substantially similar to elements of the table saw 100 described above are identified with the same reference numerals used in FIGS. 1-3, while new or modified elements of the table saw 202 are identified with new reference numerals.

The dual ratchet system 200 includes a first ratchet 204 and a second ratchet 206 pivotally mounted to the carriage 124 of the table saw 202. In the embodiment shown, the first ratchet 204 and the second ratchet 206 rotate about a common axis defined by a ratchet bolt 208. The first ratchet 204 has first tip portion 210 (FIG. 6) at one end and a first retention portion 212 at an opposed end with the ratchet bolt 208 passing through the first ratchet 204 at a location generally between the first tip portion 210 and the first retention portion 212. The second ratchet 206 has a second tip portion 214 (FIG. 6) at one end and a second retention portion 216 at an opposed end with the ratchet bolt 208 passing through the second ratchet 206 at a location generally between the second tip portion 214 and the second retention portion 216.

The table saw 202 includes a swing arm assembly 218 that is rotatably mounted to the carriage 124. Similar to the swing arm assembly 142 discussed above with reference to FIGS. 1-3, the swing arm assembly 218 rotates about a pivot 220 of the carriage 124 in response to an actuation force triggered by the sensing and control circuit of the table saw safety system.

Figure 6:
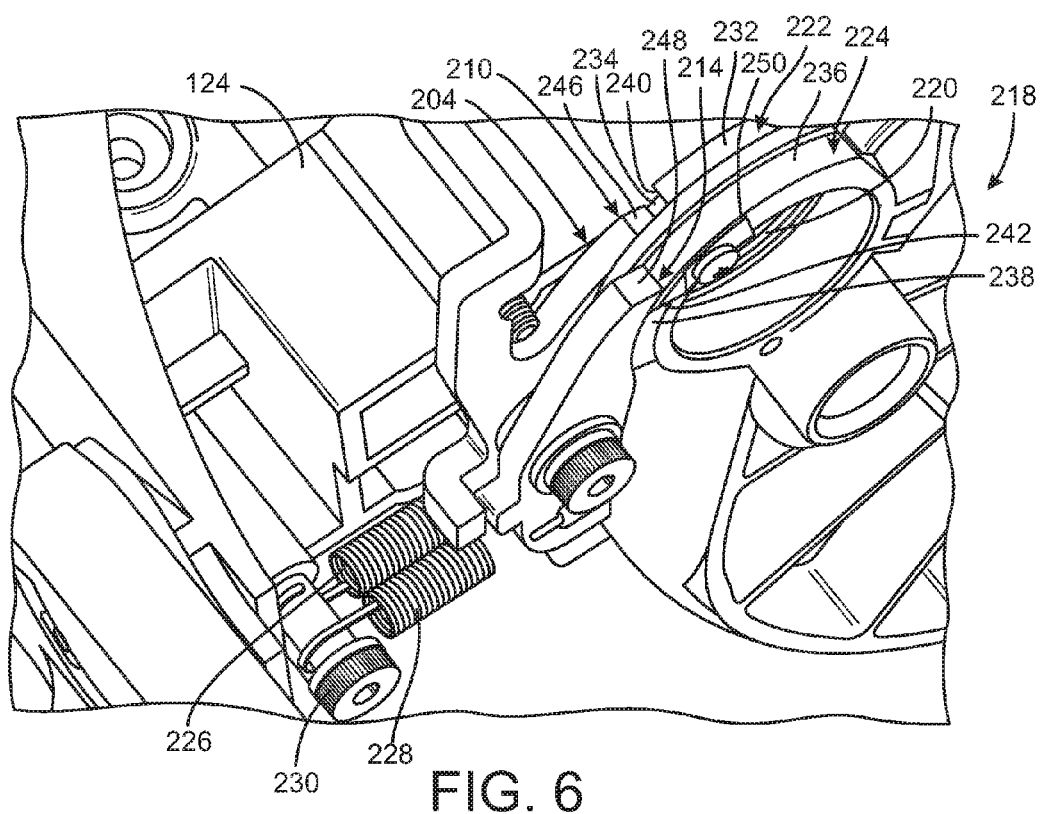
FIG. 6 depicts a top perspective view of the table saw of FIG. 5 showing a first pawl of the dual ratchet mechanism in an first active position in a first groove formed about the pivot of the pivot of the swing arm.

Referring now to FIG. 5 and FIG. 6, the swing arm assembly 218 has a first contact surface 222 and a second contact surface 224 disposed substantially concentrically about the pivot 220. The first ratchet 204 and the second ratchet 206 are biased via respective first and second biasing forces such that the first tip portion 210 of the first ratchet 204 contacts the first contact surface 222 and the second tip portion 214 of the second ratchet 206 contacts the second contact surface 224. In the embodiment shown, the first and the second biasing forces are generated by a first extension spring 226 and a second extension spring 228, respectively. The first extension spring 226 extends between the first retention portion 212 of the first ratchet 204 and a spring bolt 230. The second extension spring 228 extends between the second retention portion 216 of the second ratchet 206 and the spring bolt 230. In some embodiments, the first and second biasing forces can be generated by torsional springs (not shown) instead of the first (226) and second (228) extension springs. In yet further embodiments, the first and the second biasing forces can be generated by compressible material disposed between the carriage 124 and the first (212) and the second (216) retention portions of the first (204) and the second (206) ratchets.

Figure 7:
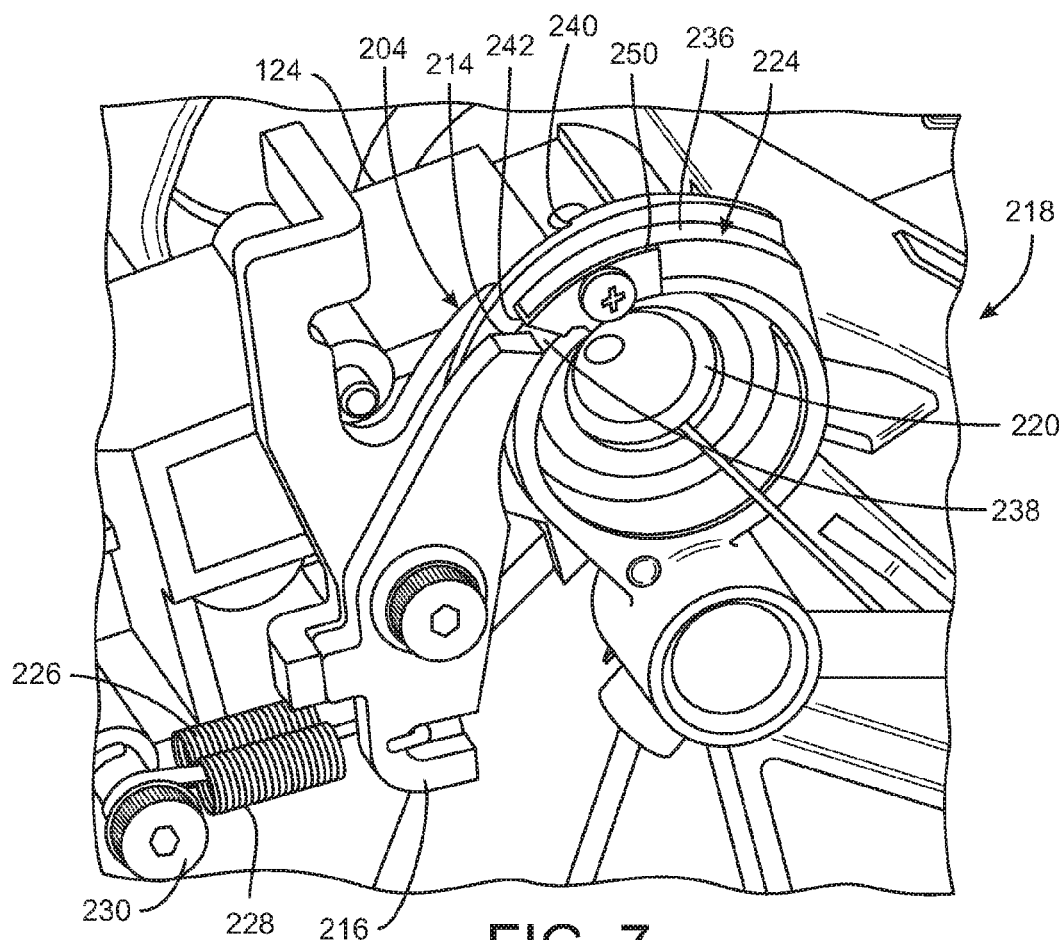
FIG. 7 shows a top perspective view of the table saw of FIG. 5 showing a second pawl of the dual ratchet mechanism in an active position in a second groove formed about the pivot of the swing arm.

With reference now to FIGS. 5-7, the first contact surface 222 of the swing arm assembly 218 includes a first ready surface 232 disposed at a first radial distance from the pivot 220 and a first active surface 234 disposed at a second radial distance from the pivot 220. In the embodiment shown, the first radial distance is greater than the second radial distance such that the first ready surface 232 is disposed farther from the pivot 220 than the first active surface 234. The second contact surface 224 of the swing arm assembly 218 includes a second ready surface 236 disposed at a third radial distance from the pivot 220 and a second active surface 238 disposed at a fourth radial distance from the pivot 220. In the embodiment shown, the third radial distance is greater than the fourth radial distance such that the second ready surface 236 is disposed farther from the pivot 220 than the second active surface 238. In some embodiments, the first radial distance and the third radial distance are the same, while in other embodiments the first radial distance and the third radial distance are different. Similarly, in some embodiments, the second radial distance and the fourth radial distance are the same, while in other embodiments the second radial distance and the fourth radial distance are different.

A first stop face 240 is formed along the first contact surface 222 at the intersection of the first ready surface 232 and the first active surface 234. The first stop face 240 is formed due to the differing radial distances of the first ready surface 232 and the first active surface 234 from the pivot 220. A second stop face 242 is formed along the second contact surface 224 at the intersection of the second ready surface 236 and the second active surface 238. The second stop face 242 is formed due to the differing radial distances of the second ready surface 236 and the second active surface 238 from the pivot 220. As will be described in more detail below, the positioning of the first (204) and the second (206) ratchets relative to the swing arm assembly 218 enables the ratchets to engage the stop faces (240 and 242) and prevent counter rotation or rebound of the swing arm assembly 218 once the swing arm assembly is moved away from the support surface in response to a sensed condition.

FIG. 4 shows a table that illustrates the total angular travel of the swing arm assembly 218 as a function of the height of the saw blade 108 above the work-piece support surface 104. For instance, the swing arm assembly 218 rotates approximately 63.7 degrees to its stop position when the blade is positioned 83 millimeters above the work-piece support surface 104. In contrast, the swing arm assembly 218 rotates approximately 39.7 degrees to its stop position when the blade is positioned 3 millimeters above work-piece support surface 104. Thus, the difference in total rotation of the swing arm assembly 218 from a blade height of 83 millimeters to a blade height of 3 millimeters is approximately 24 degrees. As shown in FIG. 4, the starting angle of 8.7 degrees for the swing arm assembly 218 is the same for each height increment depicted in the table. The dual ratchet assembly 200 disclosed herein takes into account the variances in total angular travel of the swing arm assembly 218 by staggering the position of the first stop face 240 and the second stop face 242 along the first contact surface 222 and the second contact surface 224, respectively.

Figure 8:
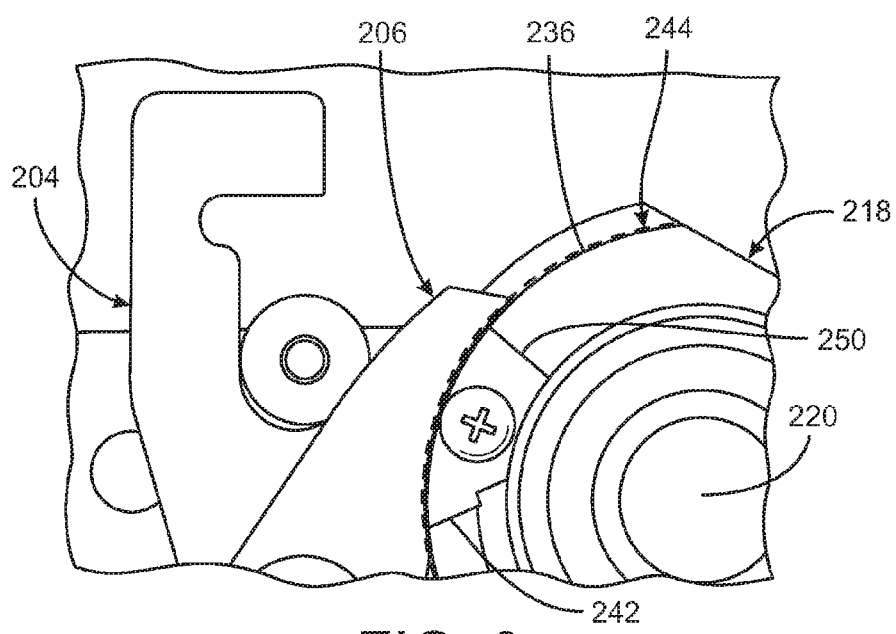
FIG. 8 shows a side plan view of the dual ratchet mechanism with the first pawl and the second pawl in a ready position along respective concentric surfaces of the swing arm.

The operation of the dual ratchet system 200 is now described with reference to FIGS. 5-7. Similar to the operation of the table saw 100 of FIG. 1, the swing arm assembly 218 of the table saw 202 is initially maintained in a latched position with the blade wheel 156 (FIG. 3) positioned sufficiently close to the work-piece support surface 104 such that the blade 108 extends above the work-piece support surface 104. With the swing arm assembly 218 in the latched position, the first tip portion 210 of the first ratchet 204 rests on the first ready surface 232 of the first contact surface 222, and the second tip portion 214 of the second ratchet 206 rests on the second ready surface 236 of the second contact surface 224. In the embodiment shown, the first ready surface 232 and the first active surface 234 of the first contact surface 222 are concentric about the pivot 220. Similarly, the second ready surface 236 and the second active surface 238 of the second contact surface 224 are concentric about the pivot 220. FIG. 8 best depicts the concentricity (depicted as dashed line 244 for clarity) of the second ready surface 236 about the pivot 220. Once the first ratchet 204 and the second ratchet are in contact with the first contact surface 222 and the second contact surface 224, respectively, the concentricity of the contact surfaces 222 and 224 ensures that the ratchets 204 and 206 remain in contact with the contact surfaces for any rotational speed of the swing arm assembly.

Referring again to FIG. 6, the dual ratchet system 200 is shown after the swing arm assembly 218 rotates from a common start position to a first angular displacement. As shown in FIG. 6, the first ratchet 204 now rests on the first active surface 234 of the swing arm assembly 218. This position of the first ratchet 204 results because, as the swing arm assembly 218 is rotated through the first angular displacement, the first active surface 234 is rotated under the first ratchet 204 and the bias of the first extension spring 226 pulls the first tip portion 210 of the first ratchet 204 against the first active surface 234. In this embodiment, the first stop face 240 is shown spaced from the first tip portion 210. Any counter rotation or rebound of the swing arm assembly 218 after the first ratchet 204 contacts the first active surface 234 will be impeded by contact between the first tip portion 210 of the first ratchet 204 and the first stop face 240 of the swing arm assembly 218. As shown in FIG. 6, the second ratchet lever 206 remains resting on the second ready surface 236 after the swing arm assembly rotates through the first angular displacement. In some embodiments, a steel wear plate 250 (FIG. 7 and FIG. 8) is added to second stop face 242 to protect the material of the swing arm assembly 218 from deformation since the second stop face 242 is typically subject to the highest percentage of impact hits from the dual ratchet system 200.

Referring again to FIG. 7, the dual ratchet system 200 is shown after the swing arm assembly 218 rotates from the common start position to a second angular displacement, which is larger than the first angular displacement. As shown in FIG. 6, the first ratchet 204 remains resting on the first active surface 234 of the swing arm assembly 218. In addition, the second ratchet 206 now rests on the second active surface 238 of the swing arm assembly 218. This position of the second ratchet 206 results because, as the swing arm assembly 218 is rotated through the second angular displacement, the second active surface 238 is rotated under the second ratchet 206 and the bias of the second extension spring 228 pulls the second tip portion 214 of the second ratchet 206 against the second active surface 238. In this embodiment, the second stop face 242 is shown spaced from the second tip portion 214. Any counter rotation or rebound of the swing arm assembly 218 after the second ratchet 206 contacts the second active surface 238 will be impeded by contact between the second tip portion 214 of the second ratchet 206 and the second stop face 242 of the swing arm assembly 218.

Figure 15:
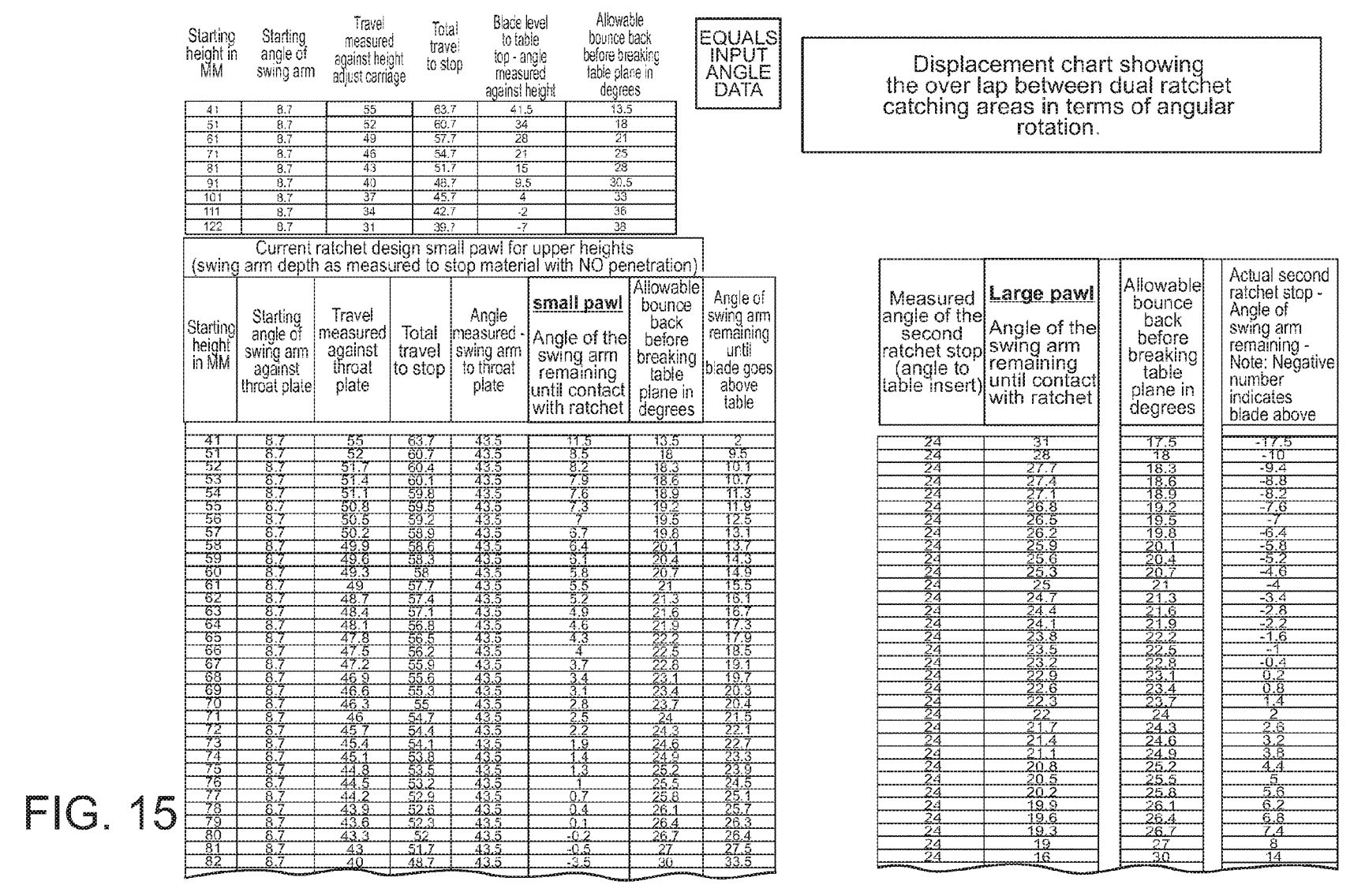

FIG. 6 and FIG. 7 best illustrate the staggered arrangement of the first stop face 240 and the second stop face 242 about the pivot 220 of the swing arm assembly 218. In operation, the staggered arrangement of the stop faces 240 and 242 enables the dual ratchet system 200 to account for the variances in total angular displacement of the swing arm assembly 218 and ensure the blade cannot rebound back above the work-piece support surface 104. In the embodiment shown, the first ratchet 204 is configured to release onto the first active surface 234 first. Shortly thereafter, depending on the elevation of the blade 108 against the work-piece support surface 104, and upon continued rotation of the swing arm assembly 218, the second ratchet 206 is configured to release onto the second active surface 238. As best shown in FIG. 6, there are some angular displacements in which the first ratchet 204 is in contact with the first active surface 234, but the second ratchet 206 is still in contact with the second ready surface 236 and, therefore, is not in position to prevent counter rotation of the swing arm assembly 218. However, even if the second ratchet 206 does not release onto the second active surface 238, the first ratchet 204 is already in position to engage the first stop face 240 and prevent counter rotation of the swing arm assembly 218. FIG. 15 shows a table that identifies angular displacements of the swing arm assembly 218 in which the first ratchet 204 is positioned to engage the first stop face 240, but the second ratchet 206 is not yet in position to engage the second stop face 242.

In some instances, there can be angular displacements in which the second ratchet 206 begins to release towards the second active surface 238, but the second ratchet 206 does not fully release onto the second active surface 238 before the swing arm assembly 218 rebounds and counter rotates towards the support surface 104. This partial release of the second ratchet 206 results in the second ratchet 206 impacting only a tip portion of the second stop face 242 near the second ready surface 236. The wear plate 250 (FIG. 7 and FIG. 8) added to the second stop face 242 ensures there is no deformation in the impact area between the second ratchet 206 and the second stop face 242, even if the impact occurs at the tip portion of the second stop face 242.

Referring still to FIG. 6 and FIG. 7, the first tip portion 210 of the first ratchet 204 has a first angled face 246. The first stop face 240 is angled such that contact between the first stop face 240 and the first angled face 246, even partial contact, causes the first ratchet 204 to ramp closed and fully engage the first stop face 240. Similarly, the second tip portion 214 of the second ratchet 206 has a second angled face 248. The second stop face 242 is angled such that contact between the second stop face 242 and the second angled face 248, even partial contact, causes the second ratchet 206 to ramp closed and fully engage the second stop face 242. The angles on the first and the second stop faces 240 and 242 and the first and the second ratchets 204 and 206 are also configured to absorb the remaining energy left in the swing arm assembly 218 after it has hit the stop pad 122. The energy is then transferred thru the first and the second ratchets 204 and 206 and into the ratchet bolt 208, which is solidly mounted into carriage 124.

Referring now to FIGS. 9-12, the dual ratchet system 200 is shown with the first ratchet 204 and the second ratchet 206 in a released position. The released position allows the swing arm assembly 218 to rotate back into the latched position once the condition that caused activation of the table saw safety system is cleared. In the embodiment shown, the first ratchet 204 includes a release portion 252 that extends away from the ratchet bolt 208. The release portion 252 has an end with a contact portion 254 extending therefrom in a direction parallel with the common axis defined by the ratchet bolt 208. The contact portion 254 has a generally planar surface that is configured to be contacted by the user to release the first ratchet 204.

The first ratchet 204 further includes an engaging portion 256 that extends from the first retention portion 212 in a direction generally parallel with the common axis and towards the second retention portion 216 of the second ratchet 206. The engaging portion 256 contacts an abutment surface 258 of the second ratchet 204 such that rotation of the first ratchet 204 towards the released position also rotates the second ratchet 206 towards the released position. As used herein, rotation of the first ratchet 204 towards the released position means rotation of the first ratchet 204 such that the first tip portion 210 is rotated away from and out of contact with the first contact surface 222 of the swing arm assembly 218. Accordingly, rotation of the first ratchet 204 also rotates the second tip portion 214 of the second ratchet 206 away from and out of contact with the second contact surface 224 of the swing arm assembly 218. The arrow 260 (FIGS. 9-11) indicates generally the direction of force that the user imparts on the contact portion 254 of the first ratchet 204 to rotate the first and the second ratchets 204 and 206 into the released position.

Figure 9:
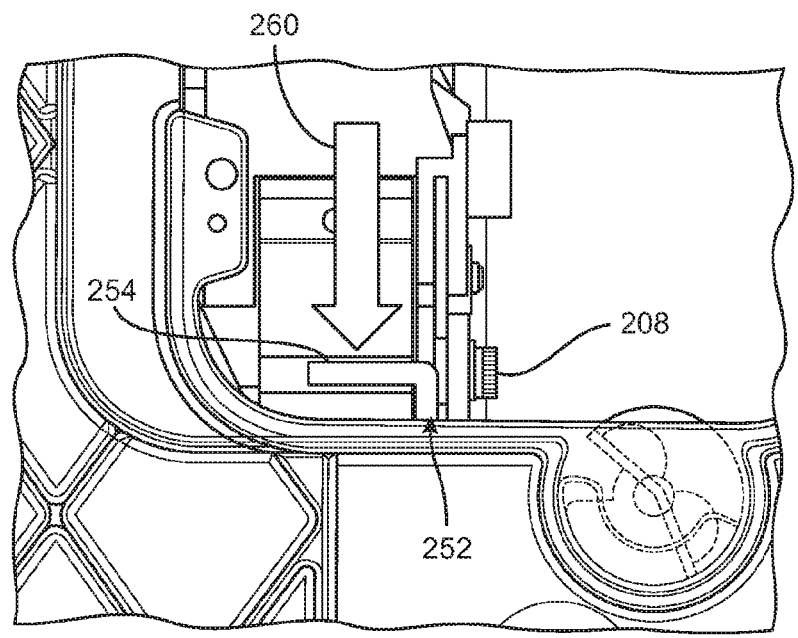
FIG. 9 depicts a top plan view of the table saw of FIG. 5 with the throat plate removed to show the dual ratchet mechanism in a release position.
Figure 10:
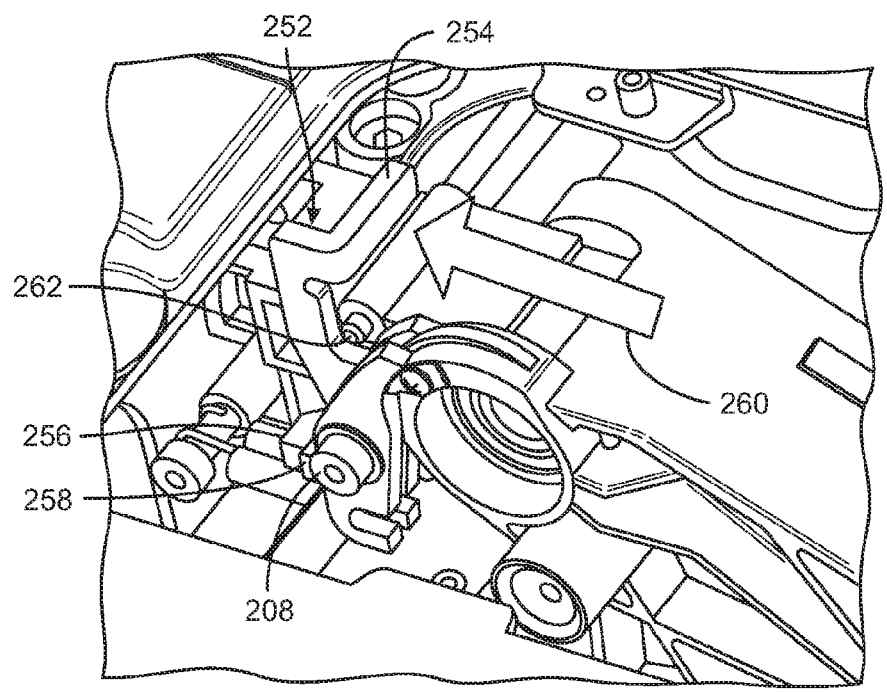
FIG. 10 shows a top perspective view of the table saw of FIG. 9 further illustrating the dual ratchet mechanism in the release position.
Figure 11:
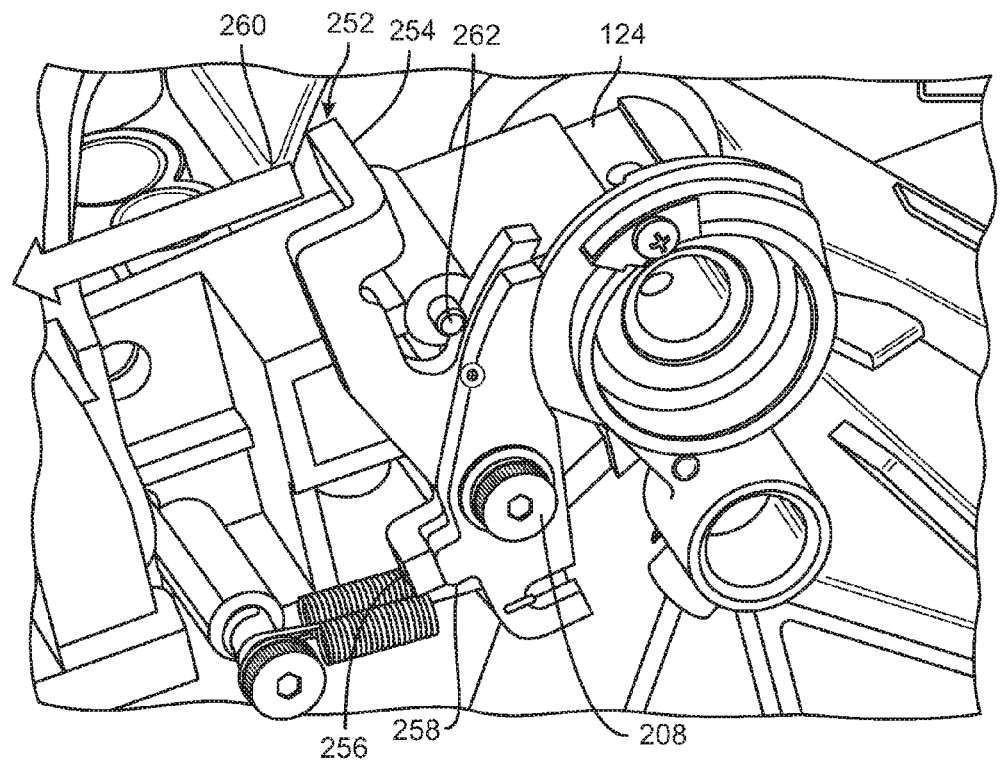
FIG. 11 shows a side perspective view of the table saw of FIG. 9 illustrating the dual ratchet mechanism in the release position and resting against a stop pin formed on the carriage assembly of the table saw.
Figure 12:
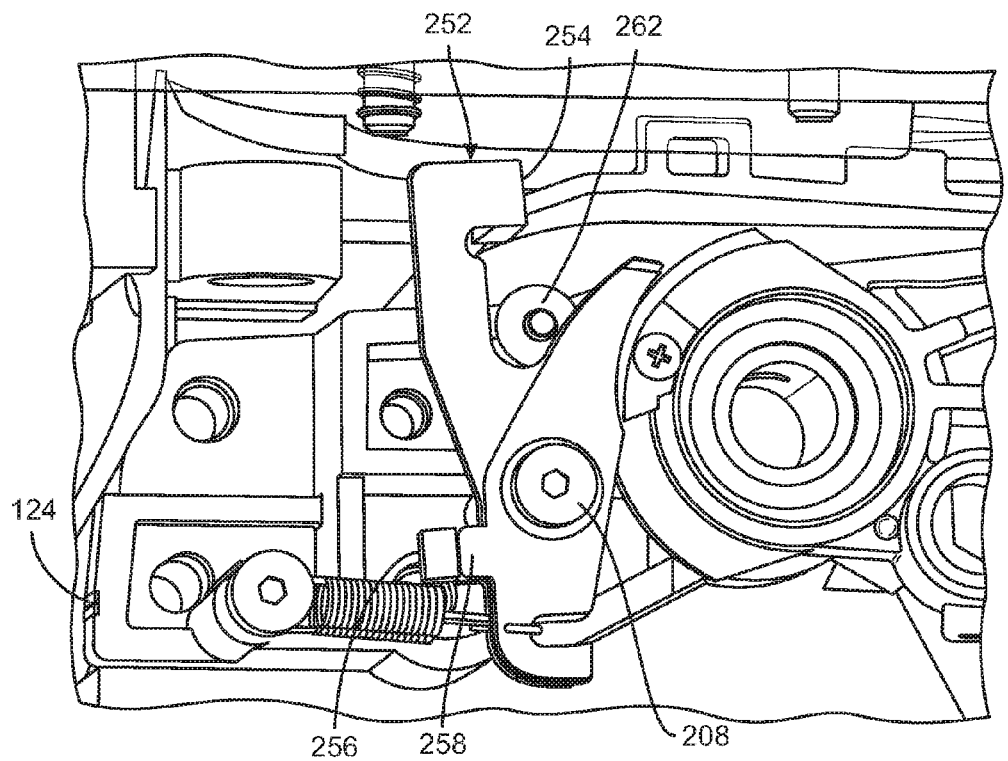
FIG. 12 depict another side perspective view of the table saw of FIG. 9 showing the dual ratchet mechanism in the release position and resting against the stop pin.

In the embodiment shown in FIGS. 10-12, a stop 262 is formed on the carriage 124. The stop 262 is positioned between the release portion 252 and the tip portion 210 of the first ratchet 204. The stop 262 contacts the tip portion 210 when the first ratchet 204 has been rotated to the released position. The stop 262 prevents damage to the first and the second extension springs 226 and 228 from over rotation of the first and the second ratchets 204 and 206 during release of the swing arm assembly 218. As best shown in FIG. 9 and FIG. 10, the contact portion 254 of the first ratchet 204 is positioned generally proximate to the work-piece support surface 104 such that upon removal of the throat plate (not shown) of the table saw 202, the user can easily access the contact portion 254 and release the swing arm assembly 218.

The configuration of the dual ratchet system 200 is configured to not only stop the swing arm assembly 218 and blade 108 from rebounding back above the work-piece support surface 104, but also to minimize reaction time for the first ratchet 204 and the second ratchet 206 to drop and get into their stopping positions. This minimized reaction time is accomplished by allowing the swing arm assembly 218 to rotate freely (concentrically) thru the contact areas between the ratchets 204 and 206 and swing arm 218 itself, thereby eliminating any radially outward force that could throw the ratchets off, or away from the swing arm assembly 218 (due to the high speed nature of the device). Also, because of the need to minimize the area of the undercarriage compartment of the table saw, the dual ratchet system 200 ensures there is always at least one ratchet in position to prevent the blade from rebounding back above the plane of the support surface, at any blade elevation, once the safety system has been activated.

Figure 13:
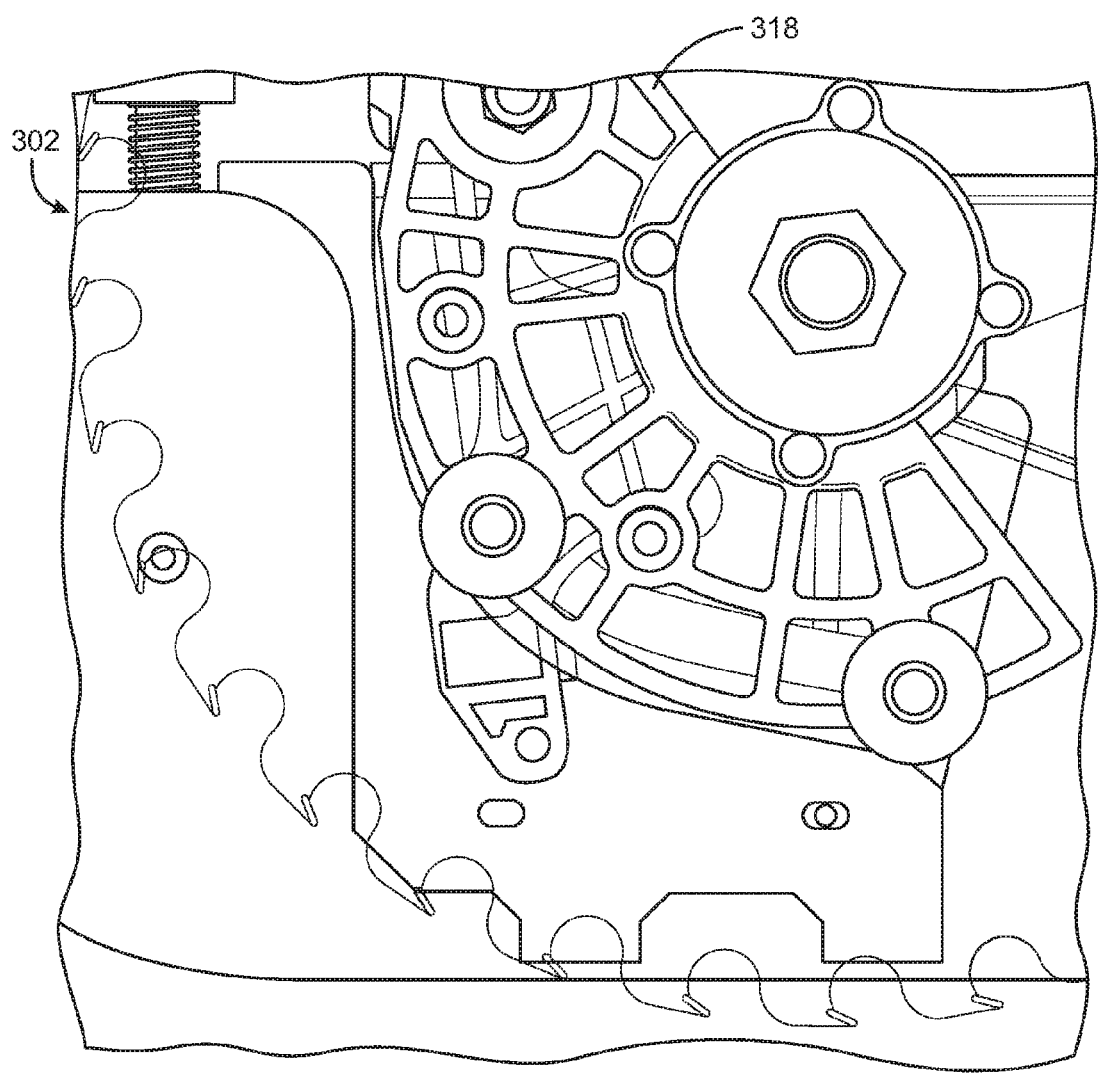
FIG. 13 and FIG. 14 show an embodiment of a table saw in which a single ratchet mechanism can be incorporated to prevent a swing arm of the table saw from rebounding toward a work-piece support surface after the swing arm has been moved away from the user in response to blade contact with a user.
Figure 14:
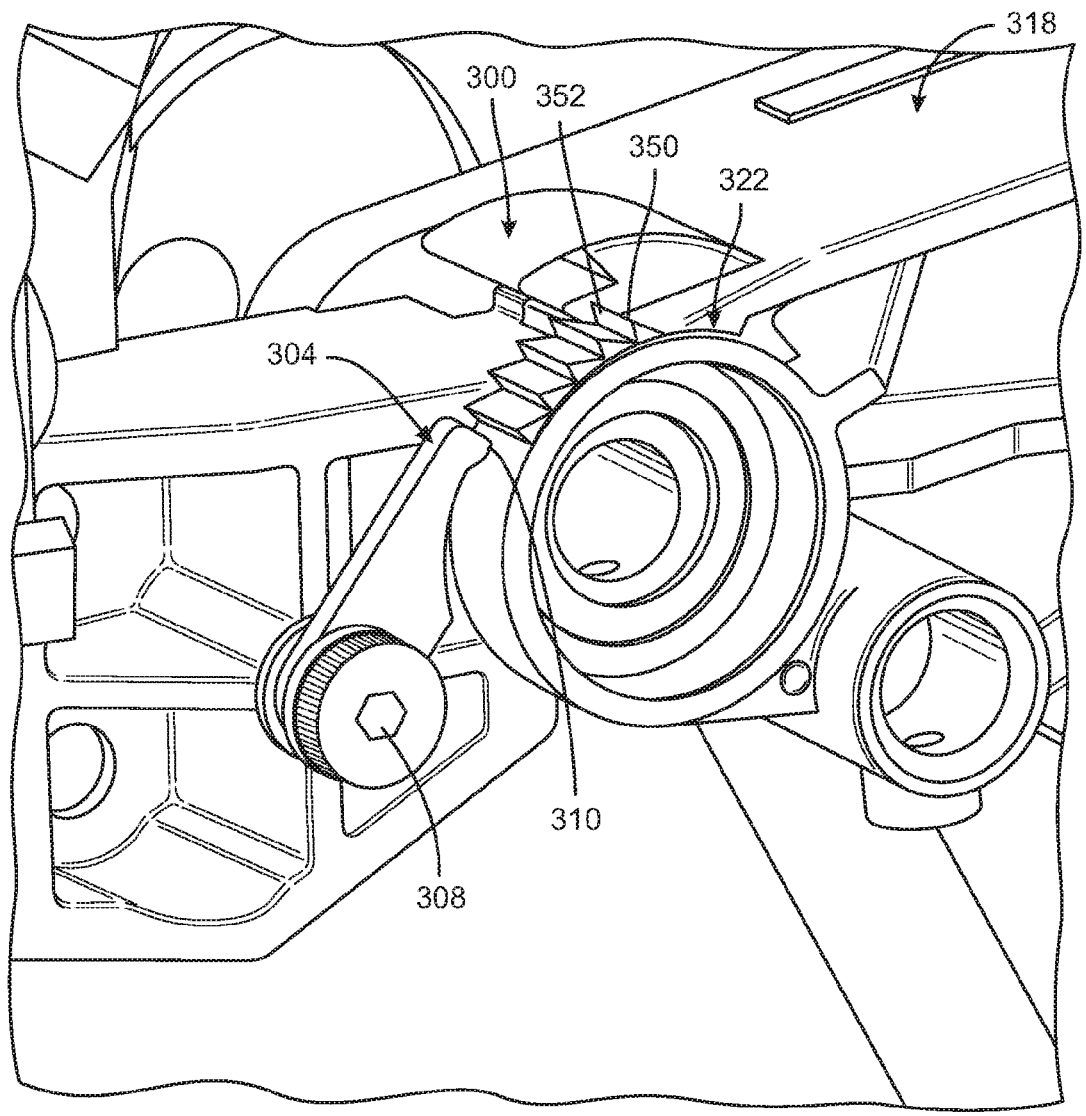

Referring now to FIG. 13 and FIG. 14, the table saw 302 in another embodiment incorporates a single ratchet system 300 to prevent the swing arm assembly 318 from counter rotating above the work-piece support surface. The single ratchet system 300 is similar to the dual ratchet system 200 described above except that the swing arm assembly 318 has only a single contact surface 322 and the single ratchet system 300 includes only a single ratchet 304. Similar to the first contact surface 222 of the dual ratchet system 200, the single contact surface 322 is disposed substantially concentrically about the pivot 320 of the swing arm assembly 313. Similar to the first ratchet 204 of the dual ratchet system 200, the single ratchet 304 is rotatable about a pivot 308 and has a tip portion 310 that is biased towards the single contact surface 322. To implement the single ratchet system 300, the angular displacement of the swing arm assembly 318 should be constant or less restricted, the blade should be allowed to go below the carriage, or the carriage should be much lower to accommodate such displacement.

With reference now to FIG. 14, the swing arm assembly 318 has a plurality of teeth 350 disposed along a portion of the single contact surface 322. The teeth define respective stop faces 352 that can engage the tip portion 310 of the single ratchet to prevent counter rotation of the swing arm assembly from different blade heights. The embodiment shown in FIG. 14 illustrates the swing arm assembly 318 after rotating through a given angular displacement in a clockwise direction as viewed parallel to the rotation axis of the swing arm assembly 318. Since the tip portion 310 is biased toward the single contact surface 322, any counter rotation in the counter clockwise direction will be impeded by contact between the tip portion 310 and any one of the successive stop faces 352. Although the single ratchet 304 is shown having only one tip portion configured to impede the counter rotation of the swing arm assembly, the single ratchet in other embodiments may be formed with multiple tip portions that interact with one or more of the stop faces formed in the swing arm assembly 318.

In yet further embodiments, a ratchet system includes three or more ratchets configured to interact with any number of stop faces on any number of contact surfaces on a swing arm assembly in order to prevent counter rotation of the swing arm assembly above the support surface.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:
1. A table saw, comprising:
a frame that supports a work surface;
a swing arm that cooperates with the frame via a pivot, the swing arm defining first and second contact surfaces disposed concentrically about and proximate to the pivot;

a blade rotatably attached to the swing arm at a position spaced from the pivot, the blade having an operating position in which the blade extends above the work surface and a retracted position in which an uppermost extent of the blade is positioned below the work surface, the swing arm rotatable about the pivot to move the blade from the operating position to the retracted position in response to a sensed condition;

a first ratchet configured to cooperate with the first contact surface so as to maintain the blade in the retracted position after the swing arm rotates over any one of a first range of angular displacements from the operating position; and a second ratchet configured to cooperate with the second contact surface so as to maintain the blade in the retracted position after the swing arm rotates over any one of a second range of angular displacements from the operating position, the second range of angular displacements including angular displacements that are greater than angular displacements of the first range of angular displacements;

wherein the first and second ratchets are independently pivotable about a common axis, the common axis spaced from the pivot through which the swing arm cooperates with the frame.

2. The table saw of claim 1, further comprising a carriage supported by the frame and configured to move relative to the frame, wherein:

the swing arm cooperates with the carriage via the pivot, the operating position of the blade is adjustable via a linear displacement of the swing arm relative to the frame, and the angular displacement of the of swing arm to move the blade from the operating position to the retracted position varies depending on the linear position of the swing arm relative to the frame.

3. The table saw of claim 2, wherein:

the first range of angular displacements of the swing arm corresponds to a respective first range of operating positions of the blade, and the second range of angular displacements of the swing arm corresponds to a respective second range of operating positions of the blade.

4. The table saw of claim 2, wherein:

the first contact surface defines a first stop face that cooperates with the first ratchet to maintain the blade in the retracted position, the second contact surface defines a second stop face that cooperates with the second ratchet to maintain the blade in the retracted position, and a position of the second stop face about the pivot is staggered relative to a position of the first stop face about the pivot to account for the varying angular displacements of the swing arm.

5. The table saw of claim 4, wherein:

the first contact surface includes (i) a first ready surface disposed at a first radial distance from the pivot and (ii) a first active surface disposed at a second radial distance from the pivot, the first radial distance being greater than the first active surface, the first stop face formed at an intersection of the first ready surface and the first active surface the second contact surface includes a second ready surface disposed at a third radial distance from the pivot and a second active surface disposed at a fourth radial distance from the pivot, the third radial distance being greater than the fourth radial distance, the second stop face formed at an intersection of the second ready surface and the second active surface.

6. The table saw of claim 4, wherein:

the first ratchet has a first tip portion with a first angled face, the first stop face is angled, and cooperation between the first angled face and the first stop face causes the first ratchet to ramp towards the first active surface and fully engage the first stop face, and the second ratchet has a second tip portion with a second angled face, the second stop face is angled, and cooperation between the second angled face and the second stop face causes the second ratchet to ramp towards the second active surface and fully engage the second stop face.

7. The table saw of claim 4, wherein:

the first ratchet and the first stop face are configured to one or more of absorb and transfer forces resulting from an impact between the first ratchet and the first stop face during a counter rotation of the swing arm after the swing arm rotates over any one of the first range of angular displacements, and the second ratchet and the second stop face are configured to one or more of absorb and transfer forces resulting from an impact between the second ratchet and the second stop face during the counter rotation of the swing arm after the swing arm rotates over any one of the second range of angular displacements.

8. The table saw of claim 7, further comprising a wear plate positioned over at least a portion of the second stop face, the wear plate protecting the second ratchet and the second stop face from damage resulting from repeated impacts therebetween.

9. The table saw of claim 5, wherein:

the first and second ratchets contact the first and second ready surfaces, respectively, when the blade is in the operating position, after rotation of the swing arm over any one of the first range of angular displacements, the first ratchet contacts one or more of the first active surface and the first stop face, and after rotation of the swing arm over any one of the second range of angular displacements, the first ratchet contacts one or more of the first active surface and the first stop face and the second ratchet contacts one or more of the second active surface and the second stop face.

10. The table saw of claim 5, wherein:

the first and second ratchets contact the first and second ready surfaces of the swing arm, respectively, when the blade is in the operating position, after rotation of the swing arm over any one of the first range of angular displacements, the first active surface is rotated under a first tip portion of the first ratchet and the first tip portion is biased into contact with the first active surface via a first biasing member, and after rotation of the swing arm over any one of the second range of angular displacements, (i) the first active surface is rotated under the first tip portion of the first ratchet and the first tip portion is biased into contact with the first active surface via the first biasing member and (ii) the second active surface is rotated under a second tip portion of the second ratchet and the second tip portion is biased into contact with the second active surface via the second biasing member.

11. The table saw of claim 1, wherein the first and second ratchets are biased against the first and second contact surfaces, respectively, via respective first and second biasing members.

12. The table saw of claim 4, further comprising a stop attached to the frame and configured to arrest the rotation of the swing arm from the operating position,
   wherein the cooperation of one or more of the first and second ratchets with the first and second stop faces, respectively, ensures that the blade is maintained in the retracted position after a counter rotation of the swing arm from the stop.

13. The table saw of claim 1, wherein a portion of the second range of angular displacements of the swing arm is equal to a portion of the first range of angular displacements of the swing arm.

14. The table saw of claim 1, wherein the first ratchet has (i) a main body portion that extends along a plane oriented normal to a rotation axis of the pivot and (ii) a release portion that extends from the main body portion in a direction parallel to the rotation axis of the pivot, the release portion operable by a user to release the cooperation of the first ratchet and the first contact surface so as to return the blade to the operating position.

15. The table saw of claim 14, wherein the first ratchet further includes an engaging portion extending from the main body portion in a direction parallel to the rotation axis of the pivot, the engaging portion configured to cooperate with second ratchet so as to release the cooperation of the second ratchet and the second contact surface when the release portion of the first ratchet is operated to release cooperation of the first ratchet and the first contact surface.

16. The table saw of claim 1, wherein the rotation of the swing arm over the first range of angular displacements and the second range of angular displacements is in one rotational direction.

17. The table saw of claim 1, wherein the first contact surface is spaced laterally from the second contact surface in a direction parallel to a rotation axis of the pivot.

* * * * *